(12) United States Patent
Radulescu-Banu et al.

(10) Patent No.: US 12,381,825 B1
(45) Date of Patent: Aug. 5, 2025

(54) USER PLANE LOAD BALANCING IN A DISAGGREGATED BROADBAND NETWORK GATEWAY ARCHITECTURE

(71) Applicant: Juniper Networks, Inc., Sunnyvale, CA (US)

(72) Inventors: Cristina Radulescu-Banu, Lexington, MA (US); Nadeem Mohammad, Tewksbury, MA (US); Richard P. Pagliaro, Westford, MA (US); John E. Ziegler, Westborough, MA (US); Adrian Orozco, Hampstead, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 679 days.

(21) Appl. No.: 17/453,689

(22) Filed: Nov. 5, 2021

(51) Int. Cl.
*H04L 47/125* (2022.01)
*H04L 12/66* (2006.01)
*H04L 67/141* (2022.01)

(52) U.S. Cl.
CPC ......... *H04L 47/125* (2013.01); *H04L 12/66* (2013.01); *H04L 67/141* (2013.01)

(58) Field of Classification Search
CPC ....... H04L 47/125; H04L 47/70; H04L 45/00; H04L 45/24; H04L 67/00; H04L 67/141; H04L 67/1001; H04L 65/1069; H04L 12/66; H04W 28/08; H04W 40/00
See application file for complete search history.

(56) References Cited

U.S. PATENT DOCUMENTS

| | | | |
|---|---|---|---|
| 8,937,865 B1* | 1/2015 | Kumar | H04L 43/0876 370/235 |
| 8,953,623 B1* | 2/2015 | Eyada | H04L 47/125 370/401 |
| 10,412,157 B2 | 9/2019 | Thirumurthi et al. | |
| 2021/0409288 A1* | 12/2021 | Hua | H04L 12/6418 |
| 2022/0386179 A1* | 12/2022 | Dhammawat | H04W 28/20 |
| 2023/0209404 A1* | 6/2023 | Peng | H04W 28/09 370/230 |

OTHER PUBLICATIONS

"MR-459.2: Improving Service Resilience through BNG Disaggregation", Improving Service Resilience through BNG Disaggregation, Marketing Report, Mar. 2020, pp. 1-9, Broadband Forum, https://www.broadband-forum.org/marketing/download/MR-459.2.pdf.

* cited by examiner

*Primary Examiner* — Brian T Le
(74) *Attorney, Agent, or Firm* — Harrity & Harrity, LLP

(57) ABSTRACT

A disaggregated broadband network gateway (DBNG) control plane system may be configured to receive a first initialization packet associated with a user device via a first user plane and a second initialization packet associated with the user device via a second user plane. The DBNG control plane system may be configured to determine, based on at least one of the first initialization packet or the second initialization packet, one or more load balancing parameters. The DBNG control plane system may be configured to cause, based on at least one of the one or more load balancing parameters, a communication session for the user device to be established via the first user plane and not via the second user plane.

20 Claims, 8 Drawing Sheets

USER PLANE LOAD BALANCING IN A DISAGGREGATED BROADBAND NETWORK GATEWAY ARCHITECTURE

BACKGROUND

A broadband network gateway (BNG) routes traffic to and from broadband remote access devices, such as digital subscriber line access multiplexers (DSLAMs), on an Internet service provider (ISP) network. The BNG enables subscribers to connect to the broadband network, and performs authentication, authorization, and accounting; assigns Internet protocol (IP) addresses; and enforces quality of service (QOS) policies, among other examples.

SUMMARY

Some implementations described herein relate to a disaggregated broadband network gateway (DBNG) control plane system. The DBNG control plane system may include one or more memories and one or more processors. The DBNG control plane system may be configured to receive a first initialization packet associated with a user device via a first user plane and a second initialization packet associated with the user device via a second user plane. The DBNG control plane system may be configured to determine, based on at least one of the first initialization packet or the second initialization packet, one or more load balancing parameters. The DBNG control plane system may be configured to cause, based on at least one of the one or more load balancing parameters, a communication session for the user device to be established via the first user plane and not via the second user plane.

Some implementations described herein relate to a non-transitory computer-readable medium that stores a set of instructions for a DBNG control plane system. The set of instructions, when executed by one or more processors of the DBNG, may cause the DBNG to receive a first initialization packet associated with a user device via a first user plane and a second initialization packet associated with the user device via a second user plane. The set of instructions, when executed by one or more processors of the DBNG, may cause the DBNG to determine, based on the first initialization packet and the second initialization packet, a first utilization rate parameter associated with the first user plane and a second utilization rate parameter associated with the second user plane. The set of instructions, when executed by one or more processors of the DBNG, may cause the DBNG to cause, based on the first utilization rate parameter and the second utilization rate parameter, a communication session for the user device to be established via the first user plane and not via the second user plane.

Some implementations described herein relate to a method. The method may include receiving, by a DBNG control plane system, a first initialization packet associated with a user device via a first user plane and a second initialization packet associated with the user device via a second user plane. The method may include determining, by the DBNG control plane system and based on at least one of the first initialization packet or the second initialization packet, a user plane identification parameter that is associated with the first user plane. The method may include causing, by the DBNG control plane system and based on the user plane identification parameter, a communication session for the user device to be established via the first user plane and not via the second user plane.

DETAILED DESCRIPTION

Figure 1A:
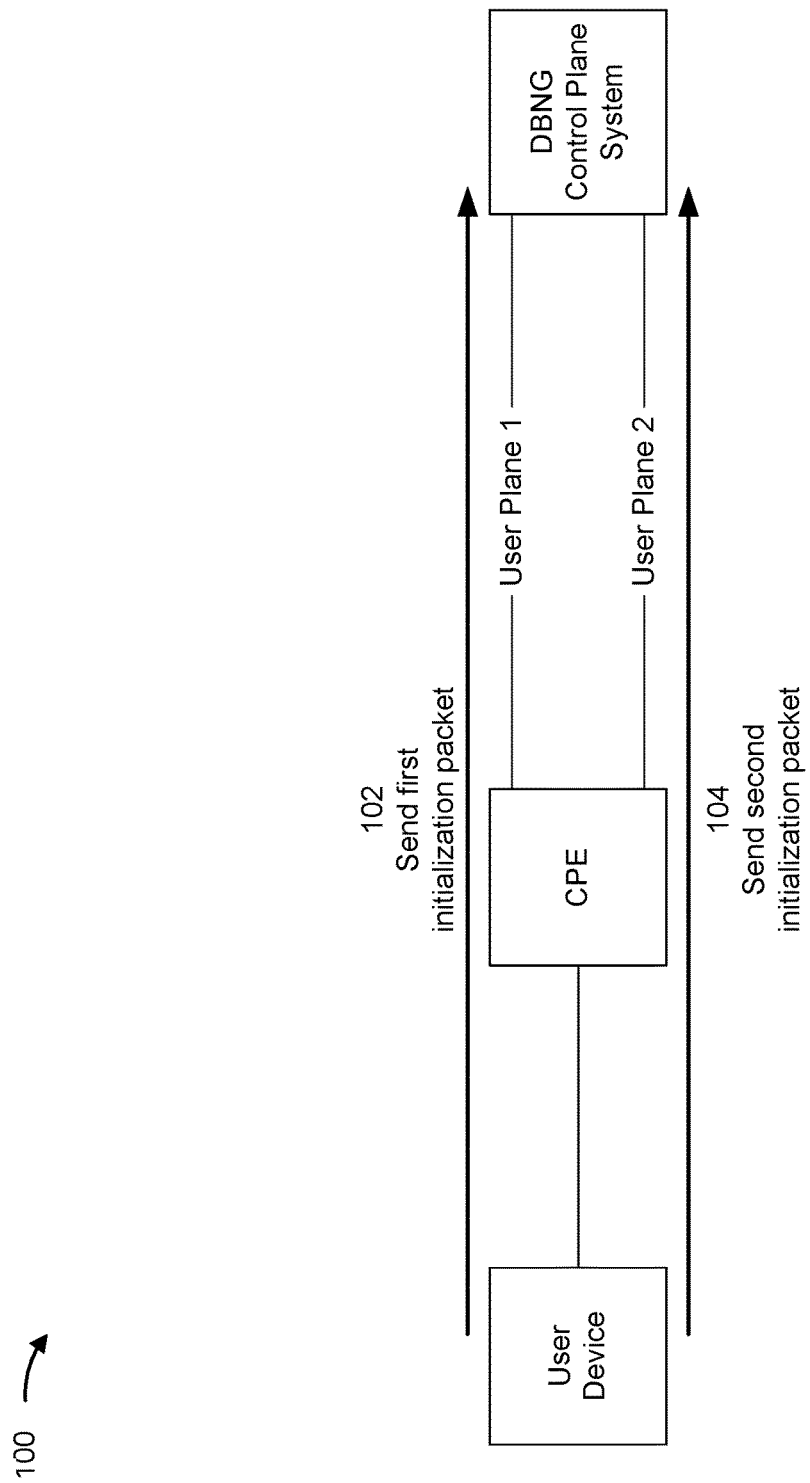
FIGS. 1A-1D are diagrams of an example implementation described herein.

The following detailed description of example implementations refers to the accompanying drawings. The same reference numbers in different drawings may identify the same or similar elements.

To accommodate growth in a quantity of subscribers, a quantity and types of services being provided by broadband network gateway (BNGs), and an amount of traffic being processed by BNGs, a disaggregated BNG (DBNG) may be deployed by a service provider. The DBNG physically and logically provides control and user plane separation (CUPS). Accordingly, user devices connect to a control device of a control plane of the DBNG via multiple user planes provided by one or more customer premises equipment (CPE). However, in many cases, a particular user plane becomes overloaded (e.g., a utilization rate of the particular user plane exceeds a utilization rate threshold, such as 80% of a maximum utilization of the particular user plane). Consequently, this causes packets between user devices and the control device via the particular user plane to be delayed, lost, dropped, and/or otherwise not communicated. This negatively impacts a performance of the user device, the control device, the control plane, the particular user plane, and the DBNG.

Some implementations described herein provide a DBNG that includes a DBNG control plane system. A user device provides a plurality of initialization packets to a CPE, which respectively forwards the plurality of initialization packets to the DBNG control plane system via a plurality of user planes. The DBNG control plane system determines, based on at least one of the plurality of initialization packets, one or more load balancing parameters (e.g., utilization rate parameters respectively associated with the plurality of user planes and/or a user plane identification parameter) and selects, based on the one or more load balancing parameters, a particular user plane, of the plurality of user planes, on which a communication session between the user device and the DBNG control plane system is to be established. Accordingly, the DBNG control plane system may cause a communication session to be established on the particular user plane (and not any other user plane of the plurality of user planes).

In this way, some implementations described herein enable load balancing of a plurality of user planes in a DBNG architecture (e.g., based on one or more load balancing parameters). This reduces a likelihood that packets sent from a user device to a DBNG control plane system via a particular user plane, of the plurality of user planes, are delayed, lost, dropped, and/or otherwise not communicated (e.g., due to the particular user plane being overloaded). This increases a likelihood that the packets are timely communicated between the user device and the DBNG control plane system. Therefore, some implementations described herein improve a performance of the user device, the DBNG control plane system, the plurality of user planes, a control plane associated with the DBNG control plane system, and the DBNG, as compared to a typical configuration of a DBNG.

FIGS. 1A-1D are diagrams of one or more example implementations 100 described herein relating to a DBNG architecture. Example implementation(s) 100 may include a DBNG control plane system, a user device, and a CPE, which are described in more detail below in connection with FIGS. 2-4. In some implementations, the CPE may be connected to the DBNG control plane system via a plurality of user planes (shown in FIG. 1A as user plane 1 and user plane 2).

In some implementations, the user device may send a plurality of initialization packets (also referred to as "first sign of life" packets, such as point-to-point protocol over Ethernet active discovery initiation (PPPoE-PADI) packet, a dynamic host configuration protocol discover (DHCP-discover) packet, or a similar packet) to the DBNG control plane system via the CPE. The user device may send the plurality of initialization packets to the DBNG control plane system to initiate a communication session between the user device and the DBNG control plane system (e.g., via the CPE and via a particular user plane of the plurality of user planes). An initialization packet may include, for example, identification information associated with the user device (e.g., an Internet protocol (IP) address of the user device, a media access control (MAC) address of the user device, and/or other identifying information of the user device). In some implementations, each of the plurality of initialization packets may include the identification information associated with the user device (e.g., the plurality of initialization packets may be copies of the same initialization packet).

In some implementations, the user device may send the plurality of initialization packets to the CPE, and the CPE may respectively forward the plurality of initialization packets to the DBNG control plane system via the plurality of user planes. For example, as shown in FIG. 1A, and by reference number 102, the user device may send a first initialization packet to the CPE, which may forward the first initialization packet to the DBNG control plane system via the user plane 1, and, as shown by reference number 104, the user device may send a second initialization packet to the CPE, which may forward the second initialization packet to the DBNG control plane system via the user plane 2. In this way, each of the plurality of initialization packets may be sent to the DBNG control plane system via a particular user plane of the plurality of user planes. Alternatively, in some implementations, the user device may send a single initialization packet to the CPE, and the CPE may duplicate the initialization packet to generate the plurality of initialization packets. Accordingly, the CPE may respectively forward the plurality of initialization packets (e.g., after generating the plurality of initialization packets) to the DBNG control plane system via the plurality of user planes.

In some implementations, the CPE may update an initialization packet, of the plurality of initialization packets, prior to forwarding the initialization packet via a user plane of the plurality of user planes. For example, the CPE may update the initialization packet to include identification information associated with the user plane (e.g., information that indicates a port of the CPE associated with the user plane, a virtual local area network (VLAN) associated with the user plane, and/or other identification information associated with the user plane). Accordingly, in some implementations, when the CPE respectively forwards the plurality of initialization packets to the DBNG control plane system via the plurality of user planes, each initialization packet, of the plurality of initialization packets, may include identification information associated with the user plane upon which the initialization packet is forwarded. For example, as shown in FIG. 1, and by reference number 102, the first initialization packet may include identification information associated with the user plane 1 (e.g., because the CPE forwards the first initialization packet to the DBNG control plane system via the user plane 1), and, as shown by reference number 104, the second initialization packet may include identification information associated with the user plane 2 (e.g., because the CPE forwards the second initialization packet to the DBNG control plane system via the user plane 2).

Figure 1B:
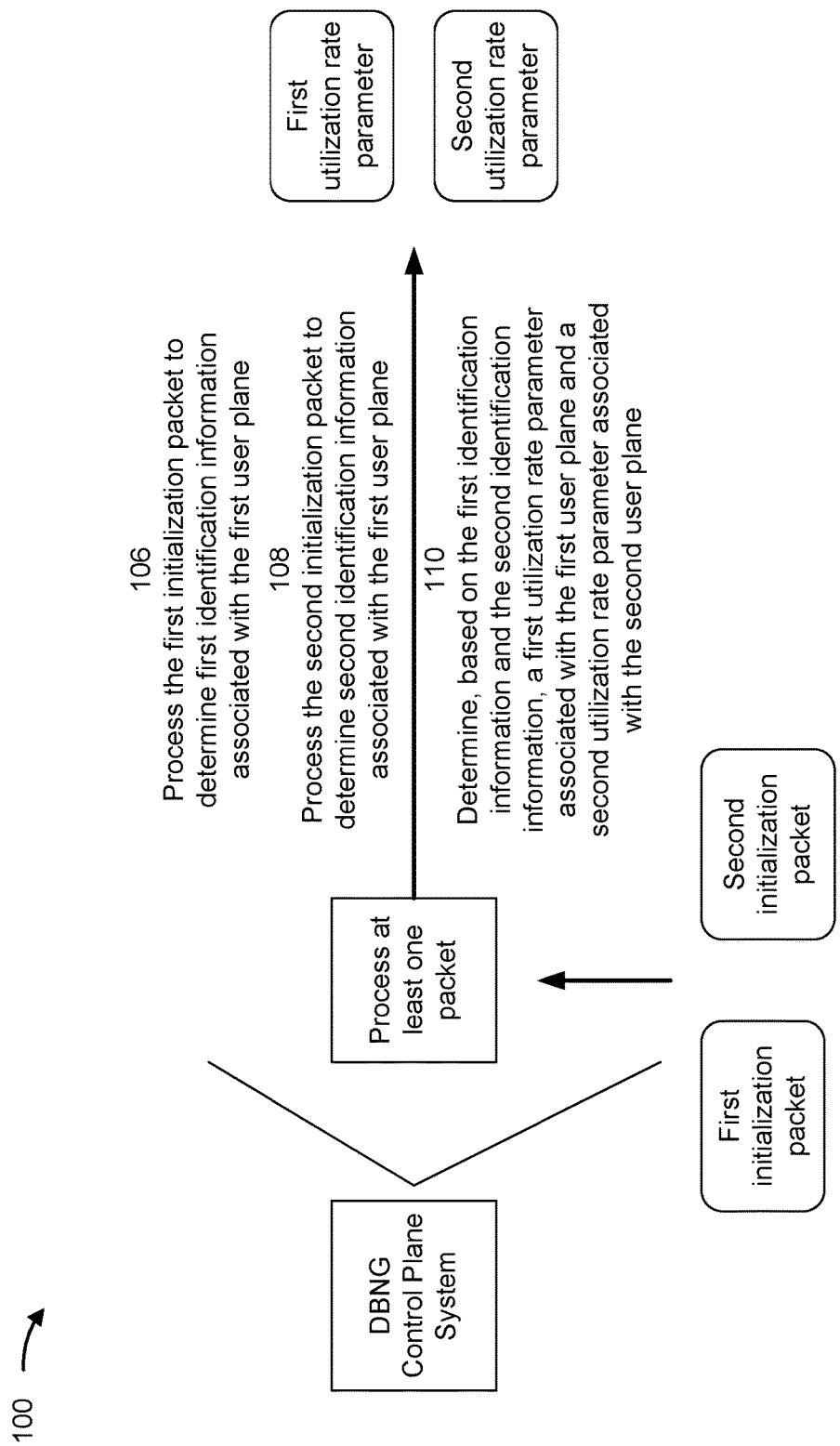
Figure 1C:
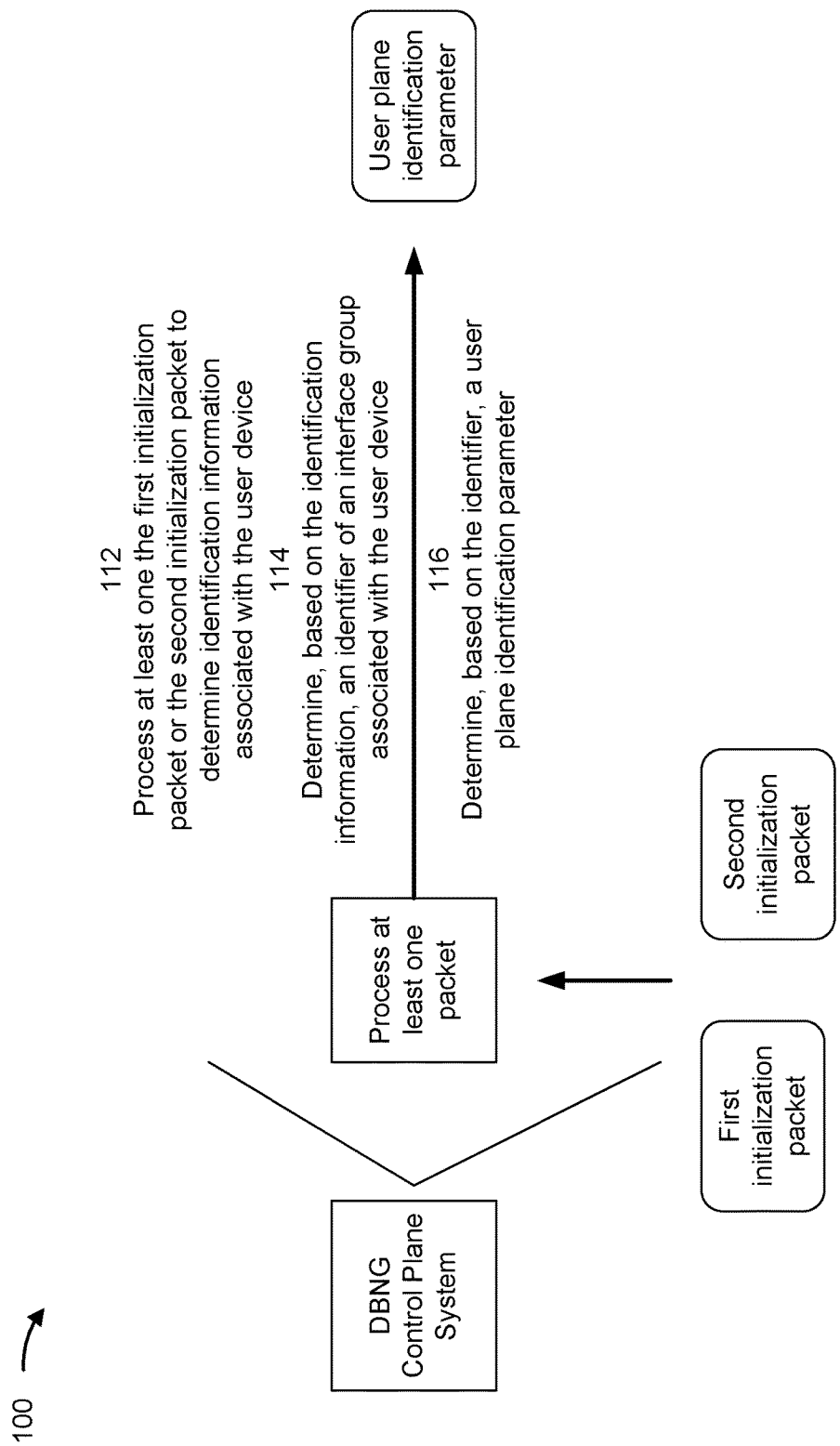

In some implementations, as shown in FIGS. 1B-1C, the DBNG control plane system may determine one or more load balancing parameters (e.g., based on at least one of the plurality of initialization packets). The one or more load balancing parameters may be used by the DBNG control plane system to determine which user plane, of the plurality of user planes, upon which a communication session is to be established between the user device and the DBNG control plane system (e.g., as further described herein in relation to FIG. 1D).

As shown in FIG. 1B, the DBNG control plane system may process at least one of the plurality of initialization packets to determine at least one utilization rate parameter respectively associated with at least one of the plurality of user planes. A utilization rate parameter associated with a user plane may indicate a utilization rate of the user plane (e.g., in terms of a percentage of a maximum utilization of the user plane).

In some implementations, the DBNG control plane system may process (e.g., parse) an initialization packet to determine identification information associated with a user plane upon which the initialization packet was forwarded and, accordingly, may determine, based on the identification information, a utilization rate parameter associated with the user plane. For example, the DBNG control plane system may identify a data structure (e.g., an electronic database, an electronic file system, and/or an electronic file that is included in the DBNG control plane system and/or accessible by the DBNG control plane system) that stores user plane utilization information and may identify, based on the identification information, an entry in the data structure that is associated with the user plane. The DBNG control plane system may process (e.g., parse) the entry to determine the utilization rate parameter associated with the user plane. In this way, the DBNG control plane system may determine a respective utilization rate parameter associated with some or all of the plurality of user planes.

In a specific example, as shown in FIG. 1B, and by reference number 106, the DBNG control plane system may process the first initialization packet to determine first identification information associated with the first user plane, and, as shown by reference number 108, the DBNG control plane system may process the second initialization packet to determine second identification information associated with the second user plane. As shown by reference number 110, the DBNG control plane system may determine, based on the first identification information and the second identification information, a first utilization rate parameter associated with the first user plane and a second utilization rate parameter associated with the second user plane. For example, the DBNG control plane system may identify the data structure that stores user plane utilization information and may search the data structure, based on the first identification information and the second identification information, to obtain the first utilization rate parameter and the second utilization rate parameter.

As shown in FIG. 1C, the DBNG control plane system may process at least one of the plurality of initialization packets to determine a user plane identification parameter. The user plane identification parameter may indicate a particular user plane upon which a communication session is to be established between the user device and the DBNG control plane system. The user plane identification parameter may be associated with an interface group that may indicate, for example, a set of interfaces (e.g., a set of logical interfaces, sometimes termed an IFL-SET), which includes the particular user plane, upon which a user device associated with the interface group may communicate.

In some implementations, the DBNG control plane system may determine an identifier of an interface group that is associated with the user device. The DBNG control plane system may determine the identifier by performing (e.g., based on at least one of the plurality of initialization packets) one or more instantiation processes (e.g., at least one of an interface stacking process, an authentication process, an authorization process, and/or an agent circuit identifier/agent remote identifier (ACI/ARI) assignment process, among other examples) to determine the identifier. For example, the DBNG control plane system may process (e.g., parse) at least one of the plurality of initialization packets to determine identification information associated with the user device and may communicate with another device (e.g., an authentication device) to authenticate the user device (e.g., to send the identification information to the other device to cause the other device to authenticate the user device). The DBNG control plane system may thereby determine (e.g., as a result of authentication of the user device) the identifier of the interface group that is associated with the user device.

Accordingly, the DBNG control plane system may determine, based on the identifier, a user plane identification parameter. For example, the DBNG control plane system may identify a data structure (e.g., an electronic database, an electronic file system, and/or an electronic file that is included in the DBNG control plane system and/or accessible by the DBNG control plane system) that stores interface group information and may identify, based on the identifier, an entry in the data structure that is associated with the interface group. The DBNG control plane system may process (e.g., parse) the entry to determine the user plane identification parameter.

In a specific example, as shown in FIG. 1C, and by reference number 112, the DBNG control plane system may process (e.g., parse) at least one of the first initialization packet or the second initialization packet to determine identification information associated with the user device. As shown by reference number 114, the DBNG control plane system may determine, based on the identification information, an identifier of an interface group associated with the user device. For example, the DBNG control plane system may communicate, based on the identification information, with another device (e.g., to authenticate the user device) and may thereby determine the identifier. As shown by reference number 116, the DBNG control plane system may determine, based on the identifier, a user plane identification parameter (e.g., that indicates a particular user plane, of the plurality of user planes, such as the user plane 1). For example, the DBNG control plane system may identify the data structure that stores interface group information and may search the data structure (e.g., based on the identifier) to obtain the user plane identification parameter.

Figure 1D:
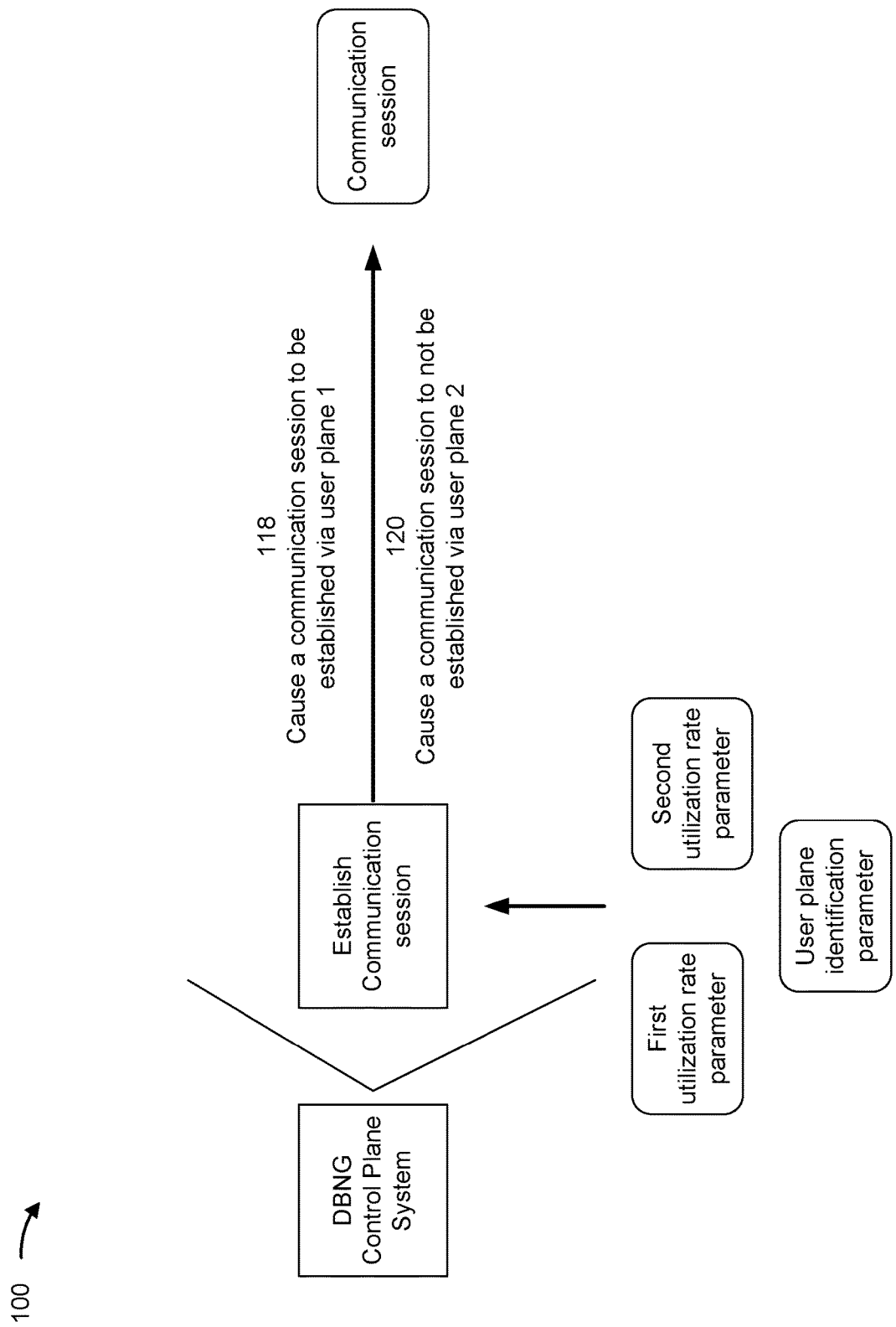

As shown in FIG. 1D the DBNG control plane system may cause a communication session to be established between the user device and the DBNG control plane system. Accordingly, the DBNG control plane system may cause the communication session to be established via a particular user plane of the plurality of user planes (e.g., based on at least one of the one or more load balancing parameters described herein in relation to FIGS. 1B and 1C).

In some implementations, the DBNG control plane system may determine to cause a communication session for the user device to be established via the particular user plane based on respective utilization rate parameters of some or all of the plurality of user planes (e.g., that were determined by the DBNG control plane system, as described herein in relation to FIG. 1B). For example, the DBNG control plane system may determine that a utilization rate parameter associated with the particular user plane satisfies (e.g., the utilization rate parameter is less than or equal to) a utilization rate threshold and may therefore determine to cause the communication session to be established via the particular user plane (and not any other user plane of the plurality of user planes). As another example, the DBNG control plane system may determine that the utilization rate parameter associated with the particular user plane satisfies the utilization rate threshold and each utilization parameter respectively associated with one or more other user planes of the plurality of user planes does not satisfy the utilization rate threshold. Accordingly, the DBNG control plane system may determine to cause the communication session to be established via the particular user plane (and not the one or more other user planes). In an additional example, the DBNG control plane system may determine that the utilization rate parameter associated with the particular user plane satisfies the utilization rate threshold and each utilization parameter respectively associated with one or more other user planes of the plurality of user planes also satisfy the utilization rate threshold. The DBNG control plane system may determine that the utilization rate parameter associated with the particular user plane is less than or equal to the utilization parameters respectively associated with one or more other user planes, and the DBNG control plane system may therefore determine to cause the communication session to be established via the particular user plane (and not the one or more other user planes).

In some implementations, the DBNG control plane system may determine to cause a communication session for the user device to be established via the particular user plane based on the user plane identification parameter (e.g., that was determined by the DBNG control plane system, as described herein in relation to FIG. 1C). For example, the DBNG control plane system may identify the particular user plane based on the user plane identification parameter and may therefore determine to cause the communication session to be established via the particular user plane (and not via any other user plane of the plurality of user planes).

Accordingly, the DBNG control plane system may cause the communication session to be established via a particular user plane of the plurality of user devices and not via any other user planes of the plurality of user planes (e.g., as described above). In a specific example (e.g., when the particular user plane is the user plane 1), as shown in FIG. 1D, and by reference number 118, the DBNG control plane system may cause the communication session to be established via the user plane 1. The DBNG control plane system may cause the communication session to be established via the user plane 1 by sending an acknowledgment packet to the user device via the user plane 1. This may cause the user device and the DBNG control plane system to further communicate via the user plane 1 and thereby cause establishment of the communication session via the user plane 1. Additionally, or alternatively, as shown by reference number 120, the DBNG control plane system may cause a communication session to not be established via the user plane 2. The DBNG control plane system may cause a communication session to not be established via the user plane 2 by sending a denial packet to the user device via the user plane 2 or by refraining from sending any packet to the user device via the user plane 2. This may cause the user device and the DBNG control plane system to not communicate via the user plane 2 and thereby prevent establishment of a communication session via the user plane 2.

In some implementations, after establishment of a communication session via a particular user plane, the DBNG control plane system may update the data structure that stores user plane utilization information. For example, the DBNG control plane system may identify an entry in the data structure that indicates a utilization rate of the particular user plane and may update (e.g., based on causing the communication session for the user device to be established via the particular user plane) the entry to indicate a different utilization rate of the particular user plane (e.g., a higher utilization rate of the particular user plane).

As indicated above, FIGS. 1A-1D are provided merely as one or more examples. Other examples may differ from what is described with regard to FIGS. 1A-1D.

Figure 2:
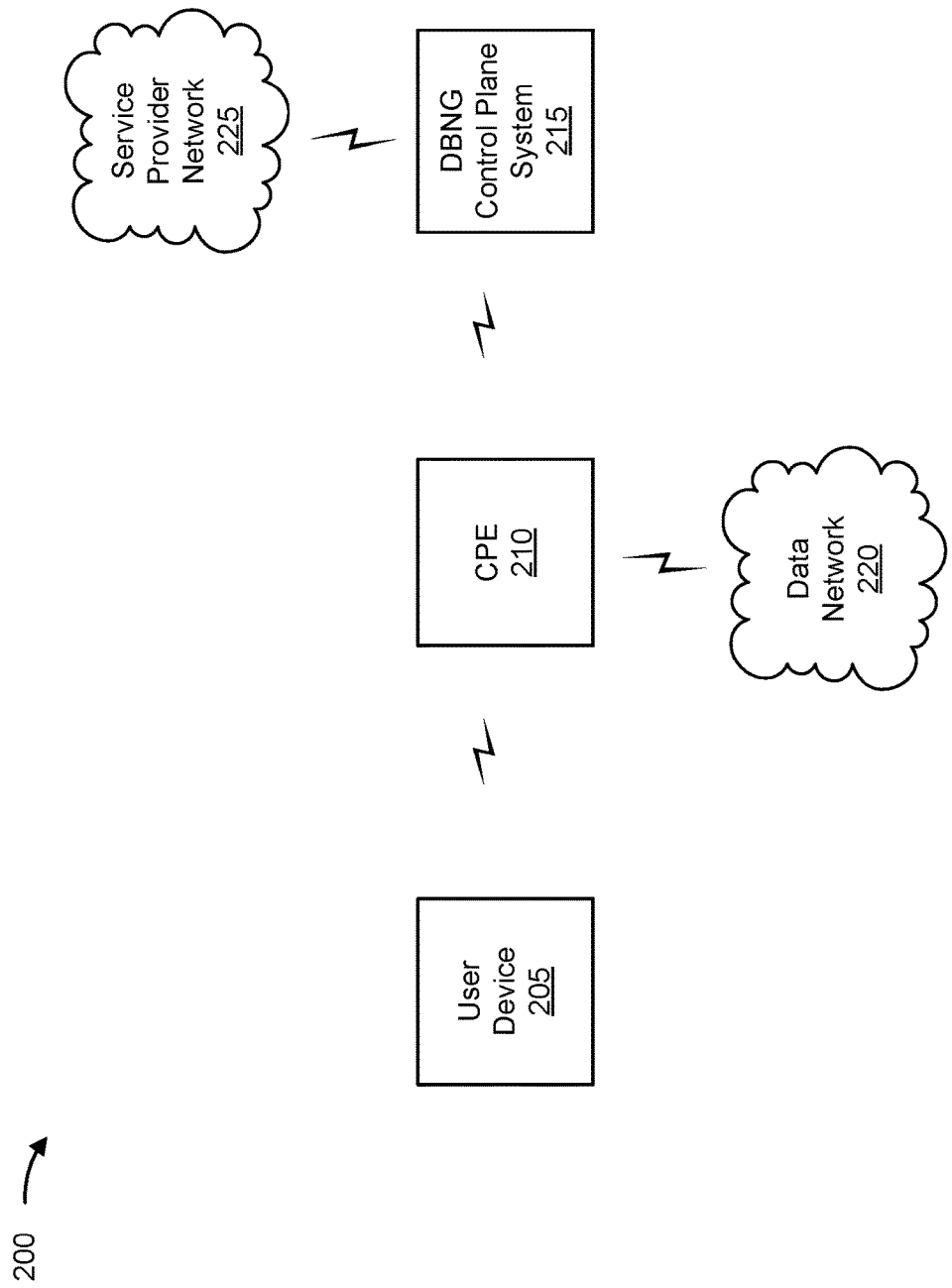
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a user device 205, a CPE 210, a DBNG control plane system 215, a data network 220, and/or a service provider network 225. Devices and/or networks of example environment 200 may interconnect via wired connections, wireless connections, or a combination of wired and wireless connections.

User device 205 includes one or more devices capable of receiving, generating, storing, processing, and/or providing information, such as information described herein. For example, user device 205 may include a mobile phone (e.g., a smart phone or a radiotelephone), a laptop computer, a tablet computer, a desktop computer, a handheld computer, a gaming device, a wearable communication device (e.g., a smart watch or a pair of smart glasses), or a similar type of device. In some implementations, user device 205 may provide one or more initialization packets to the CPE 210 and/or the DBNG control plane system 215 (e.g., to cause a communication session to be established between the user device 205 and the DBNG control plane system 215 via a particular user plane of the CPE 210). The user device may access the data network 220 via the CPE 210.

CPE 210 includes one or more devices capable of receiving, generating, storing, processing, and/or providing information, such as information described herein. For example, CPE 210 may include a multi-function networking device that may combine the functions of a Digital Subscriber Line (DSL) or cable modem, a cellular modem (e.g., a long term evolution (LTE) modem, a 5G modem, a 5G mmW modem, and/or the like), an optical line terminal (OLT), and/or a wireless access point into a single device. CPE 210 may include a router, such as a label switching router (LSR), a label edge router (LER), an ingress router, an egress router, a provider router (e.g., a provider edge router or a provider core router), a virtual router, or another type of router. Additionally, or alternatively, CPE 210 may include a gateway, a switch, a firewall, a hub, a bridge, a reverse proxy, a server (e.g., a proxy server, a cloud server, or a data center server), a load balancer, and/or a similar device. CPE 210 may employ one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). Alternatively, or additionally, different short-range wireless protocols and/or frequencies may be used by CPE 210. CPE 210 may include a plurality of user planes that connect to the DBNG control plane system 215. CPE 210 may provide the user device access to the data network 220.

DBNG control plane system 215 includes one or more devices capable of receiving, generating, storing, processing, providing, and/or routing information, as described elsewhere herein. DBNG control plane system 215 may include a communication device and/or a computing device. For example, the DBNG control plane system 215 may include a server, such as an application server, a client server, a host server, a proxy server, a virtual server (e.g., executing on computing hardware), or a server in a cloud computing system. In some implementations, DBNG control plane system 215 includes computing hardware used in a cloud computing environment. DBNG control plane system 215 may perform control plane functionality for a DBNG. Control plane functionality includes multiple control plane functions, such as subscriber session termination, performing signaling protocols such as Point-to-Point Protocol over Ethernet (PPPOE), IP over Ethernet (IPoE), IP address assignment and management, authentication/authorization/accounting (AAA), policy enforcement, gateway operations, lawful intercept, local management, keep-alive message processing, and configuring CPE 210. In some implementations, DBNG control plane system 215 may cause a communication session to be established between the user device 205 and the DBNG control plane system 215 via a particular user plane of the CPE 210.

Data network 220 includes one or more wired and/or wireless data networks. For example, data network 220 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

Service provider network 225 includes one or more wired and/or wireless networks (e.g., that are associated with a service provider, such as an Internet service provider (ISP)). For example, the service provider network 225 may include a wireless wide area network (e.g., a cellular network or a public land mobile network), a local area network (e.g., a wired local area network or a WLAN, such as a Wi-Fi network), a personal area network (e.g., a Bluetooth network), a near-field communication network, a telephone network, a private network, the Internet, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
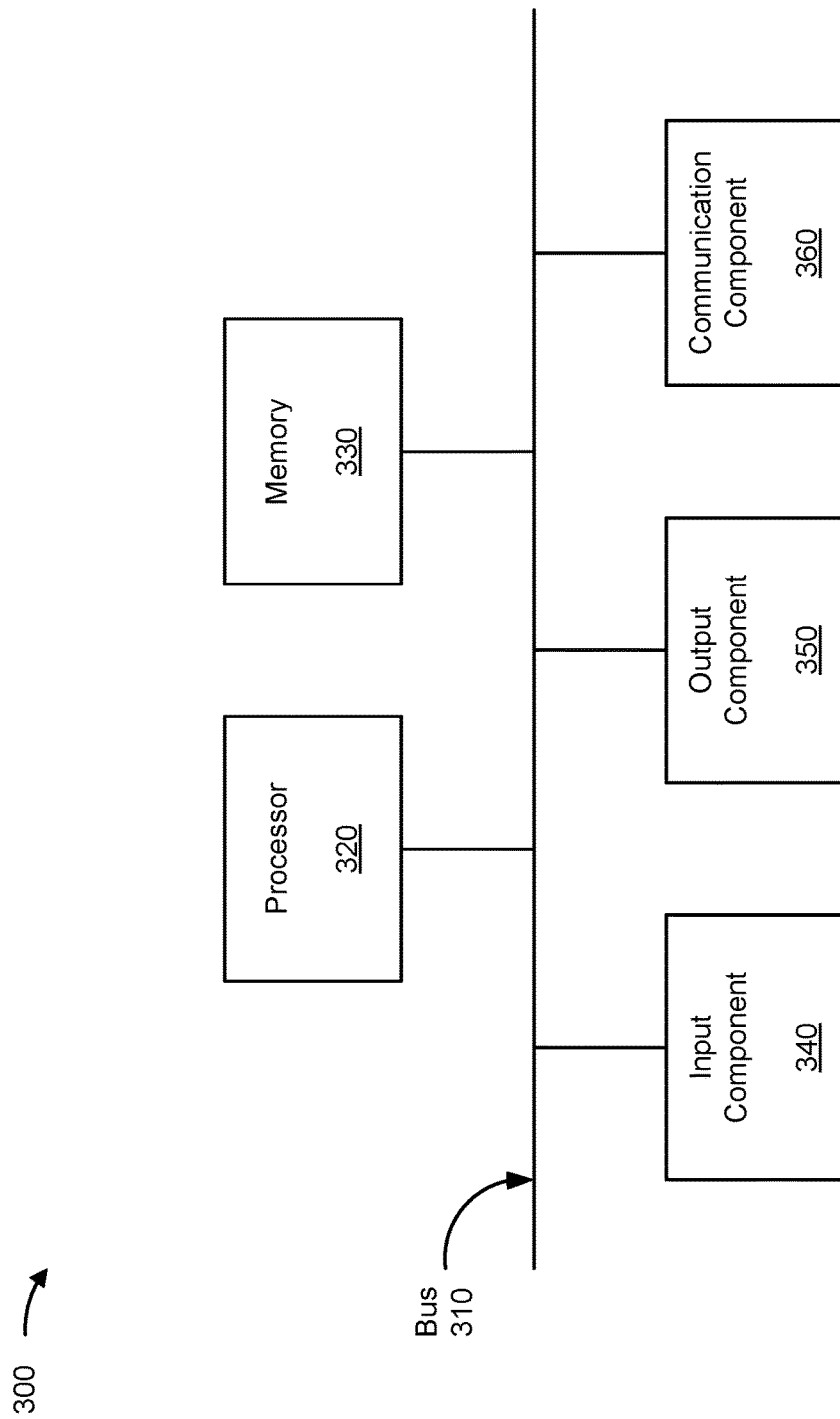
FIG. 3-4 are diagrams of example components of one or more devices of FIG. 2.

FIG. 3 is a diagram of example components of a device 300, which may correspond to user device 205, CPE 210, and/or DBNG control plane system 215. In some implementations, user device 205, CPE 210, and/or DBNG control plane system 215 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
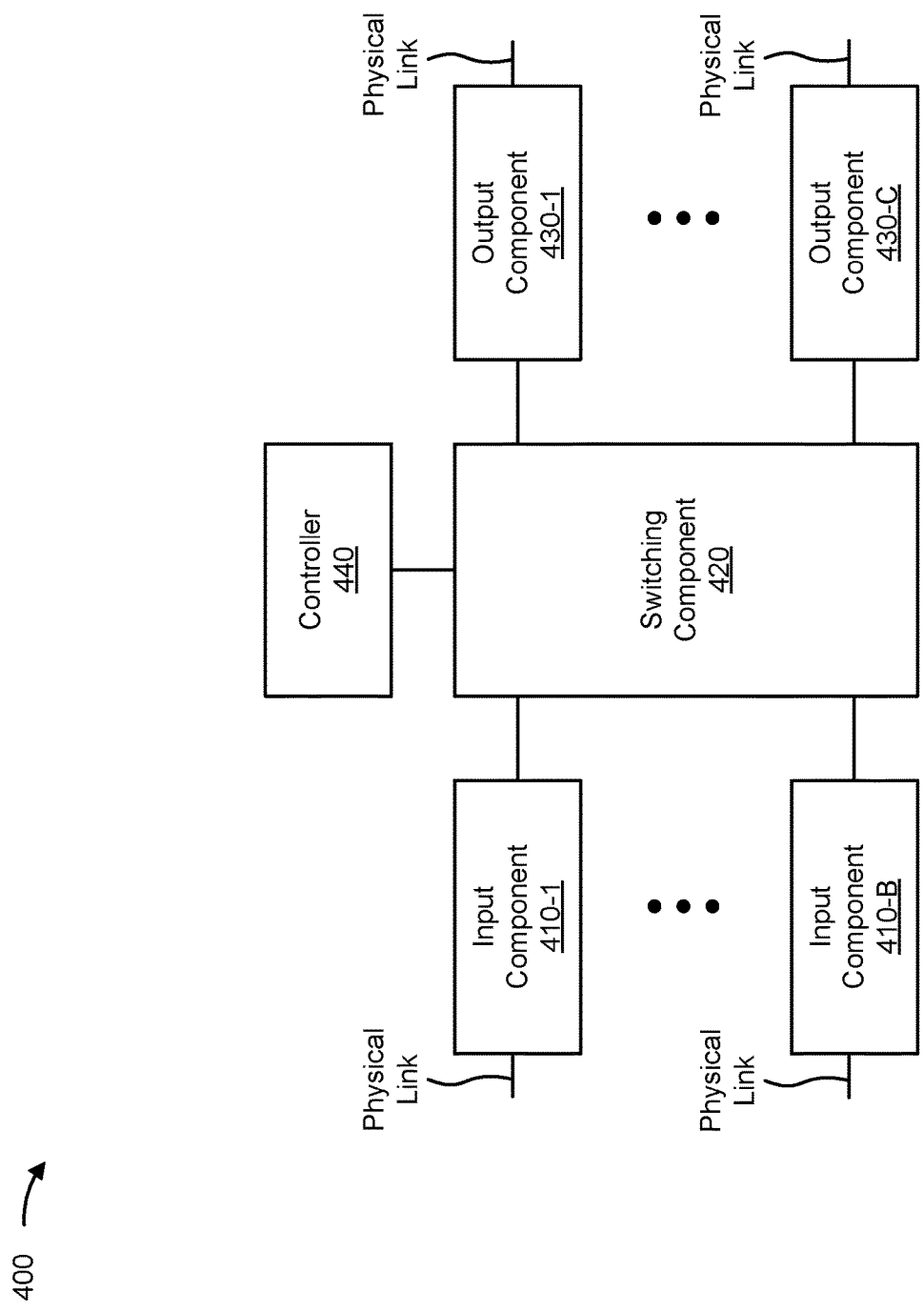

FIG. 4 is a diagram of example components of a device 400. Device 400 may correspond to user device 205, CPE 210, and/or DBNG control plane system 215. In some implementations, user device 205, CPE 210, and/or DBNG control plane system 215 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
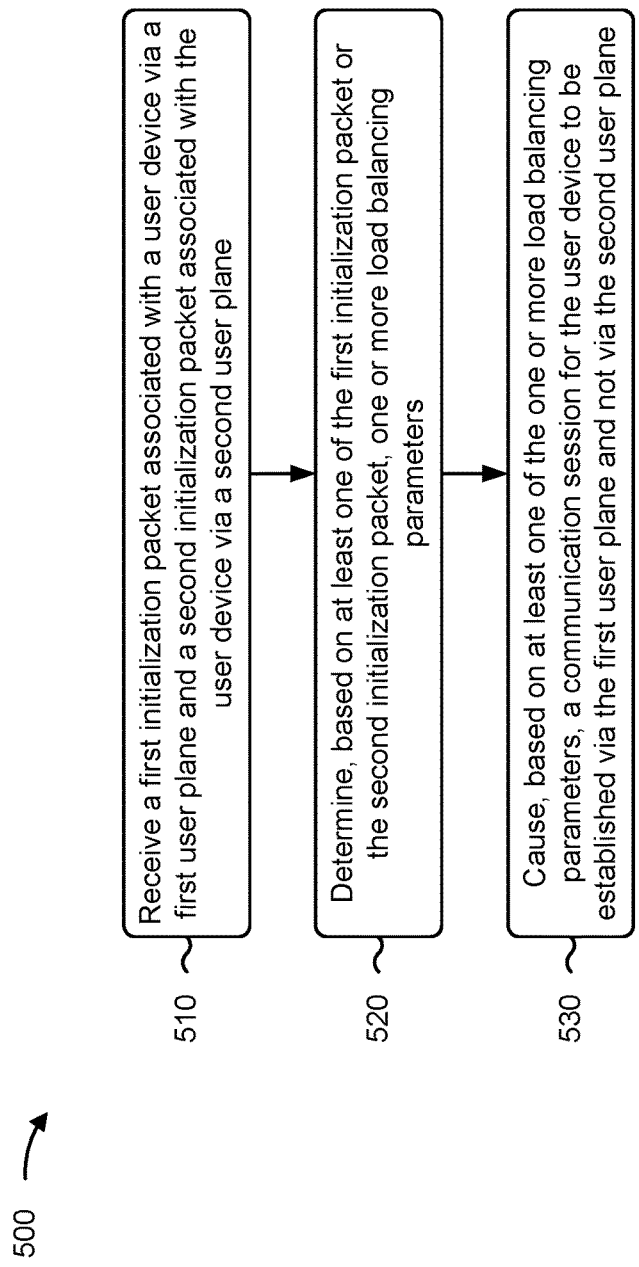
FIG. 5 is a flowchart of example processes relating to user plane load balancing in a disaggregated broadband network gateway (DBNG) architecture.

FIG. 5 is a flowchart of an example process 500 associated with user plane load balancing in a DBNG environment. In some implementations, one or more process blocks of FIG. 5 are performed by a DBNG control plane system (e.g., DBNG control plane system 215). In some implementations, one or more process blocks of FIG. 5 are performed by another device or a group of devices separate from or including the DBNG control plane system, such as a user device (e.g., user device 205) and/or a CPE (e.g., CPE 210). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include receiving a first initialization packet associated with a user device via a first user plane and a second initialization packet associated with the user device via a second user plane (block 510). For example, the DBNG control plane system may receive a first initialization packet associated with a user device via a first user plane and a second initialization packet associated with the user device via a second user plane, as described above.

As further shown in FIG. 5, process 500 may include determining, based on at least one of the first initialization packet or the second initialization packet, one or more load balancing parameters (block 520). For example, the DBNG control plane system may determine, based on at least one of the first initialization packet or the second initialization packet, one or more load balancing parameters, as described above.

As further shown in FIG. 5, process 500 may include causing, based on at least one of the one or more load balancing parameters, a communication session for the user device to be established via the first user plane and not via the second user plane (block 530). For example, the DBNG control plane system may cause, based on at least one of the one or more load balancing parameters, a communication session for the user device to be established via the first user plane and not via the second user plane, as described above.

Process 500 may include additional implementations, such as any single implementation or any combination of implementations described below and/or in connection with one or more other processes described elsewhere herein.

In a first implementation, determining the one or more load balancing parameters includes processing the first initialization packet to determine first identification information associated with the first user plane, processing the second initialization packet to determine second identification information associated with the second user plane, identifying a data structure that stores user plane utilization information, identifying, based on the first identification information and the second identification information, one or more entries in the data structure that are associated with the first user plane and the second user plane, and determining, based on the one or more entries, a first utilization rate parameter associated with the first user plane and a second utilization rate parameter associated with the second user plane.

In a second implementation, alone or in combination with the first implementation, the one or more load balancing parameters includes a utilization rate parameter associated with the first user plane, and causing the communication session for the user device to be established via the first user plane and not via the second user plane includes determining that the utilization rate parameter satisfies a utilization rate threshold, and causing, based on determining that the utilization rate parameter satisfies the utilization rate threshold, the communication session for the user device to be established via the first user plane and not via the second user plane.

In a third implementation, alone or in combination with one or more of the first and second implementations, the one or more load balancing parameters includes a first utilization rate parameter associated with the first user plane and a second utilization rate parameter associated with the second user plane, and causing the communication session for the user device to be established via the first user plane and not via the second user plane includes determining that the first utilization rate parameter satisfies a utilization rate threshold, determining that the second utilization rate parameter does not satisfy the utilization rate threshold, and causing, based on determining that the first utilization rate parameter satisfies the utilization rate threshold and that the second utilization rate parameter does not satisfy the utilization rate threshold, the communication session for the user device to be established via the first user plane and not via the second user plane.

In a fourth implementation, alone or in combination with one or more of the first through third implementations, the one or more load balancing parameters includes a first utilization rate parameter associated with the first user plane and a second utilization rate parameter associated with the second user plane and causing the communication session for the user device to be established via the first user plane and not via the second user plane includes determining that the first utilization rate parameter satisfies a utilization rate threshold, determining that the second utilization rate parameter satisfies the utilization rate threshold, determining that the first utilization rate parameter is less than or equal to the second utilization rate parameter, and causing, based on determining that the first utilization rate parameter satisfies the utilization rate threshold, that the second utilization rate parameter satisfies the utilization rate threshold, and that the first utilization rate parameter is less than or equal to the second utilization rate parameter, the communication session for the user device to be established via the first user plane and not via the second user plane.

In a fifth implementation, alone or in combination with one or more of the first through fourth implementations, causing the communication session for the user device to be established via the first user plane and not via the second user plane includes at least one of sending an allowance packet to the user device via the first user plane or refraining from sending any packet to the user device via the second user plane.

In a sixth implementation, alone or in combination with one or more of the first through fifth implementations, process 500 includes identifying a data structure that stores user plane utilization information, identifying an entry in the data structure that indicates a utilization rate of the first user plane, and updating, based on causing the communication session for the user device to be established via the first user plane and not via the second user plane, the entry to indicate a different utilization rate of the first user plane.

In a seventh implementation, alone or in combination with one or more of the first through sixth implementations, determining the one or more load balancing parameters includes determining, based on at least one of the first initialization packet or the second initialization packet, an identifier of an interface group that is associated with the user device, identifying a data structure that stores interface group information, identifying, based on the identifier, an entry in the data structure that is associated with the interface group, and determining, based on the entry, a user plane identification parameter that is associated with the first user plane.

In an eighth implementation, alone or in combination with one or more of the first through seventh implementations, determining the identifier of the interface group that is associated with the user device includes processing at least one of the first initialization packet or the second initialization packet to determine identification information associated with the user device, communicating, based on the identification information associated with the user device, with another device to authenticate the user device, and determining, based on authenticating the user device, the identifier of the interface group that is associated with the user device.

In a ninth implementation, alone or in combination with one or more of the first through eighth implementations, the one or more load balancing parameters includes a user plane identification parameter associated with the first user plane, and causing the communication session for the user device to be established via the first user plane and not via the second user plane includes causing, based on the user plane identification parameter associated with the first user plane, the communication session for the user device to be established via the first user plane and not via the second user plane.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A disaggregated broadband network gateway (DBNG) control plane system, comprising:
one or more memories; and
one or more processors to:
receive a first initialization packet associated with a user device via a first user plane and a second initialization packet associated with the user device via a second user plane;
determine, based on at least one of the first initialization packet or the second initialization packet, one or more load balancing parameters,
wherein determining the one or more load balancing parameters comprises:
determining, based on processing one or more entries in a data structure included in the DBNG control plane system that stores user plane utilization information, a first utilization rate parameter provided in terms of a percentage of a utilization of the first user plane and a second utilization rate parameter provided in terms of a percentage of a utilization of the second user plane; and
cause, based on the first utilization rate parameter and the second utilization rate parameter, a communication session between the user device and the DBNG control plane system to be established via the first user plane and not via the second user plane.

2. The DBNG control plane system of claim 1, wherein the one or more processors, when determining the one or more load balancing parameters, are to:
process the first initialization packet to determine first identification information associated with the first user plane;
process the second initialization packet to determine second identification information associated with the second user plane;
identify the data structure; and
identify, based on the first identification information and the second identification information, the one or more entries in the data structure.

3. The DBNG control plane system of claim 1, wherein the one or more processors, when causing the communication session between the user device and the DBNG control plane system to be established via the first user plane and not via the second user plane, are to:
determine that the first utilization rate parameter satisfies a utilization rate threshold; and
cause, based on determining that the first utilization rate parameter satisfies the utilization rate threshold, the communication session between the user device and the DBNG control plane system to be established via the first user plane and not via the second user plane.

4. The DBNG control plane system of claim 1, wherein the one or more processors, when causing the communication session between the user device and the DBNG control plane system to be established via the first user plane and not via the second user plane, are to:
determine that the first utilization rate parameter satisfies a utilization rate threshold;
determine that the second utilization rate parameter does not satisfy the utilization rate threshold; and
cause, based on determining that the first utilization rate parameter satisfies the utilization rate threshold and that the second utilization rate parameter does not satisfy the utilization rate threshold, the communication session between the user device and the DBNG control plane system to be established via the first user plane and not via the second user plane.

5. The DBNG control plane system of claim 1, wherein the one or more processors, when causing the communication session between the user device and the DBNG control plane system to be established via the first user plane and not via the second user plane, are to:
determine that the first utilization rate parameter satisfies a utilization rate threshold;
determine that the second utilization rate parameter satisfies the utilization rate threshold;
determine that the first utilization rate parameter is less than or equal to the second utilization rate parameter; and
cause, based on determining that the first utilization rate parameter satisfies the utilization rate threshold, that the second utilization rate parameter satisfies the utilization rate threshold, and that the first utilization rate parameter is less than or equal to the second utilization rate parameter, the communication session between the user device and the DBNG control plane system to be established via the first user plane and not via the second user plane.

6. The DBNG control plane system of claim 1, wherein the one or more processors, when causing the communication session between the user device and the DBNG control plane system to be established via the first user plane and not via the second user plane, are to at least one of:
send an allowance packet to the user device via the first user plane; or
refrain from sending any packet to the user device via the second user plane.

7. The DBNG control plane system of claim 1, wherein the one or more processors are further to:
identify the data structure;
identify an entry in the data structure that indicates a utilization rate of the first user plane; and
update, based on causing the communication session between the user device and the DBNG control plane system to be established via the first user plane and not via the second user plane, the entry to indicate a different utilization rate of the first user plane.

8. The DBNG control plane system of claim 1, wherein the one or more processors, when determining the one or more load balancing parameters, are to:
- determine, based on at least one of the first initialization packet or the second initialization packet, an identifier of an interface group that is associated with the user device;
- identify another data structure included in the DBNG control plane system that stores interface group information;
- identify, based on the identifier, an entry in the other data structure that is associated with the interface group; and
- determine, based on the entry, a user plane identification parameter that is associated with the first user plane.

9. The DBNG control plane system of claim 8, wherein the one or more processors, when determining the identifier of the interface group that is associated with the user device, are to:
- process at least one of the first initialization packet or the second initialization packet to determine identification information associated with the user device;
- communicate, based on the identification information associated with the user device, with another device to authenticate the user device; and
- determine, based on authenticating the user device, the identifier of the interface group that is associated with the user device.

10. The DBNG control plane system of claim 1, wherein the one or more load balancing parameters includes a user plane identification parameter associated with the first user plane,
wherein the one or more processors, when causing the communication session between the user device and the DBNG control plane system to be established via the first user plane and not via the second user plane, are to:
- cause, based on the user plane identification parameter associated with the first user plane, the communication session between the user device and the DBNG control plane system to be established via the first user plane and not via the second user plane.

11. A non-transitory computer-readable medium storing a set of instructions, the set of instructions comprising:
one or more instructions that, when executed by one or more processors of a disaggregated broadband network gateway (DBNG) control plane system, cause the DBNG control plane system to:
- receive a first initialization packet associated with a user device via a first user plane and a second initialization packet associated with the user device via a second user plane;
- determine, based on the first initialization packet and the second initialization packet, and based on processing one or more entries in a data structure accessible by the DBNG control plane system that stores user plane utilization information, a first utilization rate parameter provided in terms of a percentage of a utilization of the first user plane and a second utilization rate parameter provided in terms of a percentage of a utilization of the second user plane; and
- cause, based on the first utilization rate parameter and the second utilization rate parameter, a communication session between the user device and the DBNG control plane system to be established via the first user plane and not via the second user plane.

12. The non-transitory computer-readable medium of claim 11, wherein the one or more instructions, that cause the DBNG control plane system to determine the first utilization rate parameter and the second utilization rate parameter, cause the DBNG control plane system to:
- process the first initialization packet to determine first identification information associated with the first user plane;
- process the second initialization packet to determine second identification information associated with the second user plane; and
- search, based on the first identification information and the second identification information, the data structure to obtain the first utilization rate parameter and the second utilization rate parameter.

13. The non-transitory computer-readable medium of claim 11, wherein the one or more instructions, that cause the DBNG control plane system to cause the communication session between the user device and the DBNG control plane system to be established via the first user plane and not via the second user plane, cause the DBNG control plane system to:
- determine that the first utilization rate parameter satisfies a utilization rate threshold; and
- cause, based on determining that the first utilization rate parameter satisfies the utilization rate threshold, the communication session between the user device and the DBNG control plane system to be established via the first user plane and not via the second user plane.

14. The non-transitory computer-readable medium of claim 11, wherein the one or more instructions, that cause the DBNG control plane system to cause the communication session between the user device and the DBNG control plane system to be established via the first user plane and not via the second user plane, cause the DBNG control plane system to:
- determine that the first utilization rate parameter satisfies a utilization rate threshold;
- determine that the second utilization rate parameter does not satisfy the utilization rate threshold; and
- cause, based on determining that the first utilization rate parameter satisfies the utilization rate threshold and that the second utilization rate parameter does not satisfy the utilization rate threshold, the communication session between the user device and the DBNG control plane system to be established via the first user plane and not via the second user plane.

15. The non-transitory computer-readable medium of claim 11, wherein the one or more instructions, that cause the DBNG control plane system to cause the communication session between the user device and the DBNG control plane system to be established via the first user plane and not via the second user plane, cause the DBNG control plane system to:
- determine that the first utilization rate parameter satisfies a utilization rate threshold;
- determine that the second utilization rate parameter satisfies the utilization rate threshold;
- determine that the first utilization rate parameter is less than or equal to the second utilization rate parameter; and
- cause, based on determining that the first utilization rate parameter satisfies the utilization rate threshold, that the second utilization rate parameter satisfies the utilization rate threshold, and that the first utilization rate parameter is less than or equal to the second utilization rate parameter, the communication session between the user device and the DBNG control plane system to be established via the first user plane and not via the second user plane.

16. The non-transitory computer-readable medium of claim 11, wherein the one or more instructions, that cause the DBNG control plane system to cause the communication session between the user device and the DBNG control plane system to be established via the first user plane and not via the second user plane, cause the DBNG control plane system to:
send an allowance packet to the user device via the first user plane; or
send a denial packet to the user device via the second user plane.

17. A method, comprising:
receiving, by a disaggregated broadband network gateway (DBNG) control plane system, a first initialization packet associated with a user device via a first user plane and a second initialization packet associated with the user device via a second user plane;
determining, by the DBNG control plane system and based on at least one of the first initialization packet or the second initialization packet, and based on processing one or more entries in a data structure accessible by the DBNG control plane system that stores user plane utilization information, a user plane identification parameter that is associated with the first user plane, a first utilization rate parameter provided in terms of a percentage of a utilization of the first user plane, and a second utilization rate parameter provided in terms of a percentage of a utilization of the second user plane; and
causing, by the DBNG control plane system and based on the user plane identification parameter, the first utilization rate parameter, and the second utilization rate parameter, a communication session between the user device and the DBNG control plane system to be established via the first user plane and not via the second user plane.

18. The method of claim 17, wherein determining the user plane identification parameter comprises:
determining, based on at least one of the first initialization packet or the second initialization packet, an identifier of an interface group that is associated with the user device; and
searching, based on the identifier, a data structure that stores interface group information to obtain the user plane identification parameter.

19. The method of claim 18, wherein determining the identifier of the interface group that is associated with the user device comprises:
processing at least one of the first initialization packet or the second initialization packet to determine identification information associated with the user device;
communicating, based on the identification information associated with the user device, with another device to authenticate the user device; and
determining, based on authenticating the user device, the identifier of the interface group that is associated with the user device.

20. The method of claim 17, wherein causing the communication session between the user device and the DBNG control plane system to be established via the first user plane and not via the second user plane comprises:
sending an allowance packet to the user device via the first user plane; or
sending a denial packet to the user device via the second user plane.

* * * * *